(12) United States Patent
Nishimura (10) Patent No.: US 12,296,707 B2
(45) Date of Patent: May 13, 2025

(54) OPERATION MANAGEMENT DEVICE FOR CHARGING FACILITY

(71) Applicant: IHI Corporation, Tokyo (JP)

(72) Inventor: Kenji Nishimura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 238 days.

(21) Appl. No.: 17/893,578

(22) Filed: Aug. 23, 2022

(65) Prior Publication Data
US 2022/0402397 A1 Dec. 22, 2022

Related U.S. Application Data

(63) Continuation of application No. PCT/JP2021/016781, filed on Apr. 27, 2021.

(30) Foreign Application Priority Data

Jun. 24, 2020 (JP) ................. 2020-108745

(51) Int. Cl.
*B60L 53/67* (2019.01)
*B60L 53/36* (2019.01)
(Continued)

(52) U.S. Cl.
CPC ............... *B60L 53/67* (2019.02); *B60L 53/36* (2019.02); *B60L 53/62* (2019.02); *B60L 53/63* (2019.02);
(Continued)

(58) Field of Classification Search
CPC .......... B60L 53/67; B60L 53/36; B60L 53/62; B60L 53/63; B60L 53/66; B60L 58/12;
(Continued)

(56) References Cited

U.S. PATENT DOCUMENTS

| 11,148,549 B1* | 10/2021 | Alan | ................... B60L 53/62 |
| 2012/0245750 A1* | 9/2012 | Paul | ................... H02J 3/003 700/291 |

(Continued)

FOREIGN PATENT DOCUMENTS

| JP | 2012-205425 A | 10/2012 |
| JP | 2012-208685 A | 10/2012 |

(Continued)

OTHER PUBLICATIONS

Japanese Office Action issued on Jun. 6, 2023 for Japanese Patent Application No. 2022-532361.

*Primary Examiner* — Donald J Wallace
*Assistant Examiner* — Jalal C Coduroglu
(74) *Attorney, Agent, or Firm* — Volpe Koenig (57) ABSTRACT

An operation management device includes: an information acquisition unit configured to acquire information necessary for charging an on-vehicle battery of a vehicle entering a charging facility in which charging spaces coexist, power transmission devices having different amounts of transmission power being installed in the charging spaces; and an optimization unit configured to optimize a charging schedule for increasing a charge amount of the on-vehicle battery to a target charging level by charging with an available power transmission device in the charging spaces based on the acquired information so that power consumption in the charging facility is suppressed to a maximum allowable power amount or less.

9 Claims, 8 Drawing Sheets

(51) Int. Cl.
*B60L 53/62* (2019.01)
*B60L 53/63* (2019.01)
*B60L 53/66* (2019.01)
*G06Q 10/1093* (2023.01)
*H02J 7/00* (2006.01)

(52) U.S. Cl.
CPC .......... *B60L 53/66* (2019.02); *G06Q 10/1095* (2013.01); *H02J 7/00032* (2020.01); *H02J 7/0071* (2020.01); *H02J 7/007188* (2020.01)

(58) Field of Classification Search
CPC . B60L 2260/32; B60L 53/65; G06Q 10/1095; H02J 7/00032; H02J 7/0071; H02J 7/007188; H02J 2310/48; H02J 7/0013; H02J 7/00712; H02J 7/00034; Y02T 10/70; Y02T 10/7072; Y02T 90/12; Y02T 90/16
See application file for complete search history.

(56) References Cited

U.S. PATENT DOCUMENTS

| | | | | |
|---|---|---|---|---|
| 2013/0031121 | A1* | 1/2013 | Sera | B60L 53/305 707/E17.014 |
| 2015/0354974 | A1* | 12/2015 | Takehara | B60L 53/66 701/423 |
| 2016/0214491 | A1* | 7/2016 | Yoko | B60L 53/20 |
| 2018/0105051 | A1* | 4/2018 | Zheng | G06Q 20/3276 |
| 2019/0061535 | A1* | 2/2019 | Bridges | H02J 3/381 |
| 2019/0202304 | A1* | 7/2019 | Moghe | B60L 53/38 |
| 2019/0205842 | A1* | 7/2019 | Starns | G05D 1/0088 |
| 2019/0215670 | A1* | 7/2019 | Ameixieira | H04W 48/18 |
| 2019/0233102 | A1* | 8/2019 | Kaneichi | G06Q 10/083 |
| 2019/0315245 | A1* | 10/2019 | Kinomura | B60L 53/12 |
| 2020/0055419 | A1* | 2/2020 | Kim | G06Q 10/02 |
| 2021/0156703 | A1* | 5/2021 | Jin | G07C 5/008 |
| 2021/0184479 | A1* | 6/2021 | Fukubayashi | B60M 7/003 |
| 2022/0134894 | A1* | 5/2022 | Kimura | B60L 53/122 320/108 |
| 2022/0144105 | A1* | 5/2022 | Hashimoto | B60L 3/00 |
| 2022/0294277 | A1* | 9/2022 | Wolgemuth | B60L 53/63 |
| 2023/0139438 | A1* | 5/2023 | Nishita | B60L 53/67 320/109 |

FOREIGN PATENT DOCUMENTS

| | | |
|---|---|---|
| JP | 2015-019465 A | 1/2015 |
| JP | 2017-093245 A | 5/2017 |
| JP | 2018-113745 A | 7/2018 |
| JP | 2019-96104 A | 6/2019 |
| JP | 2021-021257 A | 2/2021 |
| KR | 101556058 B1 | 9/2015 |

* cited by examiner

| TIME | 21 | 22 | 23 | 24 | 1 | 2 | 3 | 4 | 5 | 6 | 7 | 8 | 9 |
|---|---|---|---|---|---|---|---|---|---|---|---|---|---|
| PS 12 (QUICK 13) | VEHICLE E | | | | | VEHICLE A | | | | VEHICLE D | | | |
| PS 21 (NORMAL 24) | VEHICLE A | | | | | | VEHICLE F | | VEHICLE C | | | | |
| PS 22 (NORMAL 25) | VEHICLE D | | | | | | | | | VEHICLE E | | | |
| PS 23 (NORMAL 26) | VEHICLE B | | | | | | | | | | | | |
| PS 31 | VEHICLE C | | | | | | | | VEHICLE F | | | | |
| PS 32 | | | | | | | | | | VEHICLE A | | | |
| PS 33 | | | | | | VEHICLE E | | | | | | | |
| PS 34 | | | | | | | | | | | | | |
| PS 35 | | | | | | | | | | | | | |

OPERATION MANAGEMENT DEVICE FOR CHARGING FACILITY

CROSS REFERENCE TO RELATED APPLICATIONS

This application is a continuation application of International Application No. PCT/JP2021/016781, now WO2021/261073, filed on Apr. 27, 2021, which claims priority to Japanese Patent Application No. 2020-108745, filed on Jun. 24, 2020, the entire contents of which are incorporated by reference herein.

BACKGROUND

1. Technical Field

The present disclosure relates to an operation management device for a charging facility.

2. Description of the Related Art

For vehicles such as electric vehicles (EVs) and the like equipped with a power receiving device of a wireless power supply system, a technology for efficiently charging an on-board battery has been studied. JP 2019-96104 A (PLT 1) discloses a vehicle management system in a parking lot in which an autonomous driving control vehicle moves in a constant electric current area (hereinafter, simply referred to as "constant current area") and a constant voltage area in this order on passages in the parking lot.

Parking slots are provided in each of the constant current area and the constant voltage area. In each parking slot, a power transmission device of a wireless power supply system is installed. When a vehicle is parked in a parking slot in the constant current area, the battery of the vehicle is charged using a charging method with a constant electric current. When a vehicle is parked in a parking slot in the constant voltage area, the battery of the vehicle is charged using a charging method with a constant voltage.

The system of PLT 1 determines a schedule to efficiently charge a battery of a vehicle to a target charging level while the vehicle is parked in a parking lot in accordance with the state of charge (SoC) of the battery and the target charging level thereof. The schedule determined by the system may include, for example, charging the battery in both the constant current area and the constant voltage area, or charging the battery only in the constant voltage area.

According to a schedule for charging the battery in both areas, firstly, a vehicle is parked in a parking slot in the constant current area by means of the autonomous driving control, and the battery is charged with a constant current from a current SoC to a certain charge amount. Thereafter, the vehicle is moved to a parking slot in the constant voltage area by means of the autonomous driving control to charge the battery with a constant voltage up to the target charging level.

According to a schedule for charging the battery only in the constant voltage area, a vehicle passes through the constant current area and is parked in a parking slot in the constant voltage area by means of the autonomous driving control, and the battery is charged from the current SoC to the target charging level.

For example, when charging a battery of a vehicle from a low remaining level to an intermediate level, the system of PLT 1 determines a schedule to charge the battery of the vehicle with a constant electric current in a parking slot in the constant current area. Otherwise, when charging a battery of a vehicle having a certain level, the system determines a schedule to charge the battery of the vehicle with a constant voltage in a parking slot in the constant voltage area. In the system of PLT 1, it is expected that the operating rate of the power transmission device in each parking slot is improved, and that the battery of each vehicle is efficiently charged by properly using the constant current charge and the constant voltage charge.

SUMMARY

Wireless power supply systems are classified depending on the amount of transmission power. For example, the SAE (American Society of Automotive Engineers) standards for passenger cars specify the WPT1 class (3.7 kW max.) and WPT2 class (7.7 kW max.) for normal charging and the WPT3 class (22 kW max.) for quick charging. Similar to the system of PLT 1, a wireless power supply system, in which power transmission devices of these classes are mixed, is likely to selectively use power transmission devices having different amounts of transmission power depending on the remaining battery level of the vehicle and the required amount of charging power.

In comparison with a power transmission device with low power of the WPT1 class or the like, the amount of transmission power provided by a power transmission device with high power of the WPT3 class or the like is relatively large. Therefore, the equipment of a power transmission device with high power becomes expensive and consumes a large amount of electric power. Therefore, it is conceivable that the number of power transmission devices with high power installed is limited compared with the power transmission devices with low power.

It is an object of the present disclosure to efficiently charge an on-vehicle battery of each vehicle in a charging facility having charging spaces in which power transmission devices of a wireless power supply system are installed, by selectively using power transmission devices having different amounts of transmission power.

An operation management device for a charging facility according to the present disclosure includes: an information acquisition unit configured to acquire information necessary for charging an on-vehicle battery of a vehicle entering a charging facility in which charging spaces coexist, power transmission devices having different amounts of transmission power being installed in the charging spaces; and an optimization unit configured to optimize a charging schedule for increasing a charge amount of the on-vehicle battery to a target charging level by charging with an available one of the power transmission devices in the charging spaces based on the acquired information so that power consumption in the charging facility is suppressed to a maximum allowable power amount or less.

The optimization unit may optimize the charging schedule to minimize a moving distance of the vehicle in the charging facility.

The optimization unit may optimize the charging schedule so that charging of the on-vehicle battery of the vehicle in the charging facility to the target charging level is completed within a predetermined time.

The information may include identification information on the vehicle, a corresponding charging method of the on-vehicle battery, and a current state of charge.

The charging facility may also serve as a parking lot, and the charging spaces may also serve as parking slots of the parking lot.

The vehicle may be an autonomous driving control vehicle. The operation management device may further include a movement control unit configured to move the autonomous driving control vehicle in the charging facility according to the charging schedule optimized by the optimizing unit.

According to the present disclosure, it is possible to efficiently charge an on-vehicle battery of each vehicle in a charging facility having charging spaces in which power transmission devices of a wireless power supply system are installed, by selectively using power transmission devices having different amounts of transmission power.

DESCRIPTION OF THE EMBODIMENTS

Figure 1:
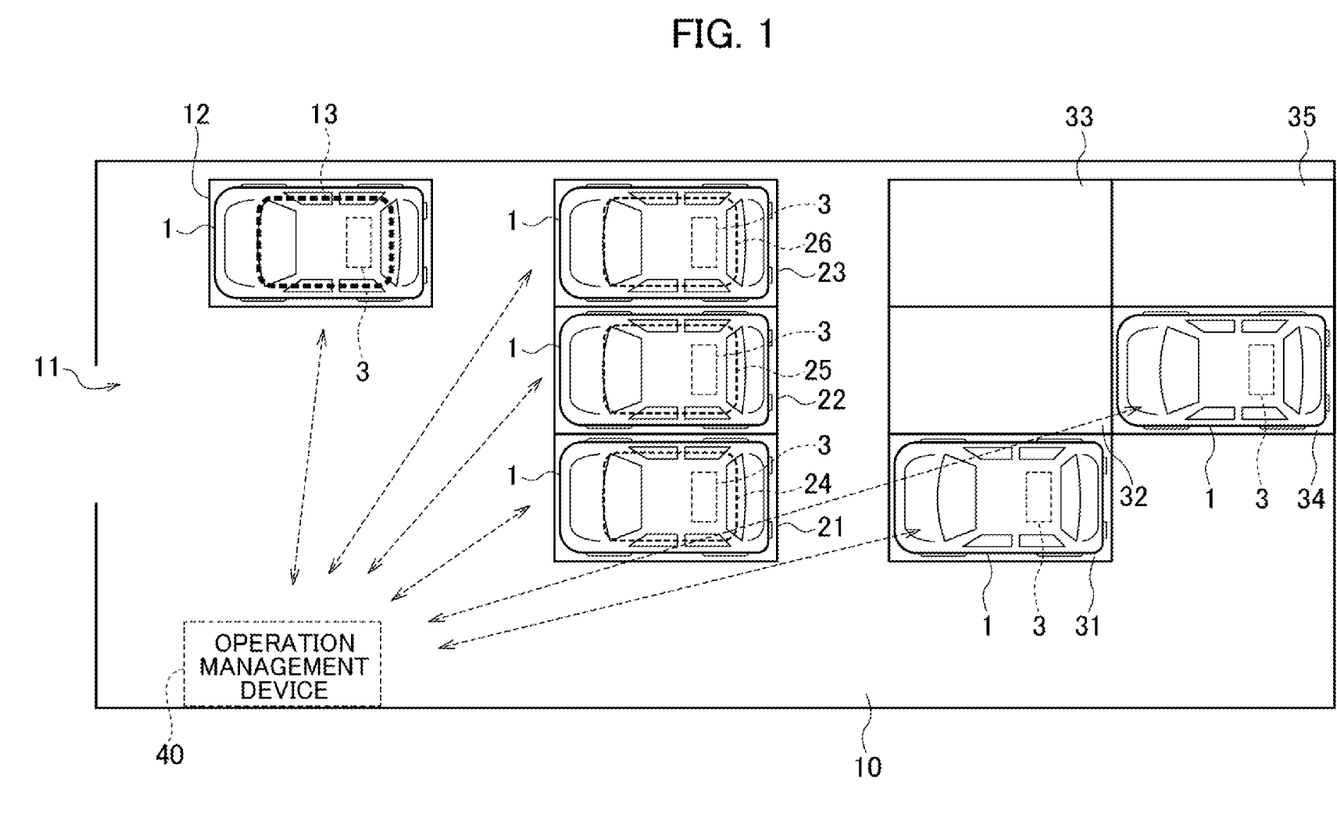
FIG. 1 is a plan view of a charging facility for vehicles whose operations are managed by an operation management device according to an embodiment.

Some exemplary embodiments will now be described with reference to the drawings. FIG. 1 shows a charging facility for vehicles whose operations are managed by an operation management device according to the present embodiment. A charging facility 10 shown in FIG. 1 may be configured in a parking lot, or a service area (parking area) on a highway (limited highway), for example.

The charging facility 10 according to the present embodiment also serves as a parking lot for vehicles 1. In the example shown in FIG. 1, the charging facility 10 includes parking slots 12, 21 to 23, 31 to 35 for nine vehicles. The vehicles 1 entering from a gate (entrance/exit) 11 can be parked in any of the parking slots 12, 21 to 23, 31 to 35.

In the present embodiment, it is assumed that all the vehicles 1 using the charging facility 10 are electric autonomous driving vehicles and are equipped with a battery as an on-vehicle battery chargeable by a wireless power supply system. Examples of the electric vehicle 1 include an EV (electric vehicle), a PHEV (plug-in hybrid vehicle), and the like.

Each vehicle 1 travels by means of autonomous operation control. The route on which each vehicle 1 travels is set in advance. Therefore, it is assumed that each vehicle 1 travels the same route every time and stops by the charging facility 10 to charge the battery 3 along the route. Each vehicle 1 can travel at any time of day or night. The travel time zone of each vehicle 1 may be predetermined, or otherwise may be determined as desired in accordance with the occurrence of a specific event.

In the charging facility 10 exemplarily shown in FIG. 1, the four parking slots 12, 21 to 23 of the nine parking slots 12, 21 to 23, 31 to 35 also serve as charging spaces for a battery 3 in the charging facility 10. In the four parking slots 12, 21 to 23, a battery 3 can be wirelessly charged. In order to wirelessly charge a battery 3, chargers 13, 24 to 26 serving as power transmission devices of the wireless power supply system are provided on the surfaces of the parking slots 12, 21 to 23.

In the example shown in FIG. 1, the charger 13 of the parking slot 12 is installed as a power transmission device with high power. That is, the charger 13 can charge the battery 3 of the vehicle 1 parked in the parking slot 12 with an amount of transmission power larger than those of the chargers 24 to 26. For example, the charger 13 has a rated output capacity of 10 kW.

In the example shown in FIG. 1, the chargers 24 to 26 in the parking slots 21 to 23 are installed as power transmission devices with low power. That is, the chargers 24 to 26 can charge the batteries 3 of the vehicles 1 parked in the parking slots 21 to 23 with an amount of transmission power smaller than that of the charger 13. For example, each charger 24 to 26 has a rated output capacity of 2 kW. That is, in the charging facility 10, chargers having different amounts of transmission power (e.g., the high-power charger 13 and the low-power chargers 24 to 26) coexist.

In the example shown in FIG. 1, the five parking slots 31 to 35 are assumed to be standby parking spaces. Therefore, these parking slots 31 to 35 are not provided with a charger for a battery 3.

The high power charger 13 has a larger amount of transmission power than those of the low power chargers 24 to 26, and thus the equipment cost is likely to be expensive. Therefore, in the charging facility 10 of FIG. 1, the number of the high-power chargers 13 is reduced compared with the number of the low-power chargers 24 to 26.

Comparing the high-power charger 13 with the low-power chargers 24 to 26, if both chargers charge the same amount of charge to the battery 3, the high-power charger 13 has a relatively short charging time but consumes a relatively high amount of electric power. On the other hand, the low power chargers 24 to 26 consume a relatively low amount of electric power but have a relatively long charging time.

In order to suppress the maximum value and the total value of the amount of electric power consumed in the entire charging facility 10 within the respective allowable ranges, it is necessary to efficiently charge the battery 3 of each vehicle 1 by selectively using the high-power charger 13 and the low-power chargers 24 to 26.

Therefore, in the present embodiment, the operation management device 40 of the charging facility 10 creates a charging schedule for the battery 3 of each vehicle 1. The charging schedule is used for determining the charging pattern for the battery 3 and guiding the vehicle 1 in the charging facility 10. The guidance control efficiently moves the vehicle 1 in the charging facility 10 in accordance with the allocation pattern prepared according to the charging pattern.

The charging pattern for the battery 3 defines which of the chargers 13, 24 to 26 charges the battery 3, and for how long and by how much transmission power the battery 3 is charged. When the battery 3 of one vehicle 1 is charged by the chargers 13, 24 to 26, the charging pattern also specifies the order of the chargers 13, 24 to 26 for charging the battery 3. The charging pattern is created in such a manner that the battery 3 of each vehicle 1 in the charging facility 10 can be efficiently charged by suppressing the maximum value and the total value of the amount of electric power consumed in the entire charging facility 10 within the respective allowable ranges.

The allocation pattern for the vehicle 1 includes the order, timing, and route by which the vehicle 1 in the charging facility 10 is moved, and the parking slots 12, 21 to 23 or the gate 11 to which the vehicle 1 is moved, in accordance with the charging pattern for the battery 3.

The operation management device 40 may comprise a cloud computer on the Internet, or may comprise a computer installed in or near the charging facility 10. In the present embodiment, the operation management device 40 is exemplarily constituted of a cloud computer.

The operation management device 40 includes hardware such as, for example, a CPU, a RAM, a ROM, and a nonvolatile external storage device. The CPU of the operation management device 40 can virtually construct the communication control unit 41 and the management unit 43 shown in FIG. 2 on the hardware of the operation management device 40 by executing, for example, a program stored in the ROM or the external storage device.

Figure 2:
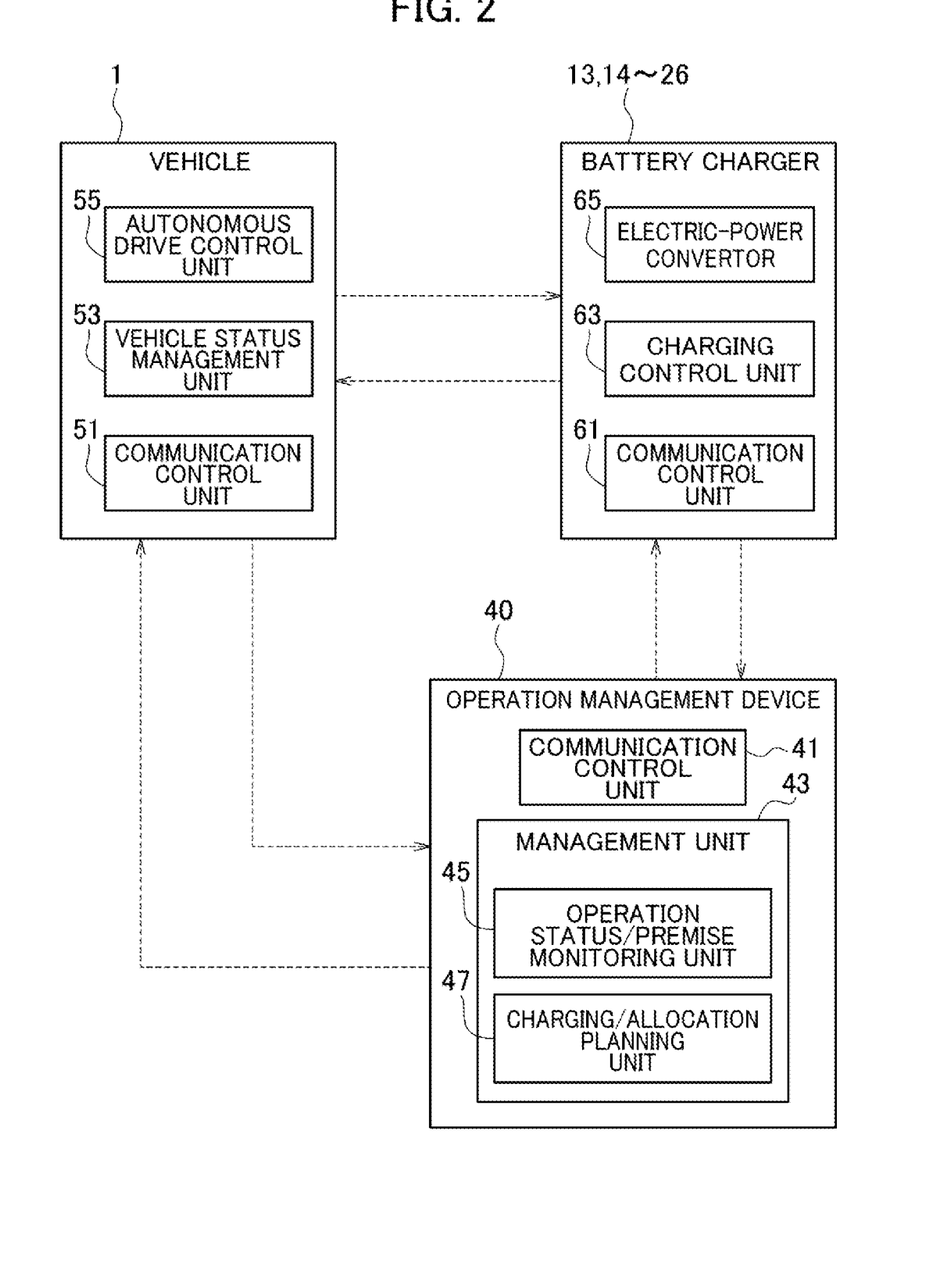
FIG. 2 is an explanatory diagram showing schematic configurations of control systems of the operation management device of the charging facility, chargers in parking slots, and the vehicles, which are shown in FIG. 1 and communicate with each other.

The communication control unit 41 can perform wireless communication with a communication control unit 51 of the vehicle 1, which is a moving object. The communication control unit 41 can also communicate with the communication control unit 61 of the chargers 13, 24 to 26 fixed to the surfaces of the parking slots 12, 21 to 23.

The communication between the communication control units 41 and 51 may be performed before the vehicle 1 enters the charging facility 10. For example, a wireless LAN (local area network) or the like can be used for communication performed by the communication control unit 41 wirelessly with the communication control unit 51 of the vehicle 1 outside the charging facility 10. When a wireless LAN is used, for example, a wireless access point (not shown) of the wireless LAN can be installed in the charging facility 10.

For communication performed by the communication control unit 41 with the fixed communication control unit 61 provided in the charging facility 10, for example, a wired LAN (local area network) constructed in the charging facility 10 can be used. A wireless LAN or the like may be used for the communication between the communication control units 41 and 61 as well as between the communication control units 41 and 51.

It should be noted that wireless communication can also be performed between the communication control unit 51 of the vehicle 1, which is a moving object, and the communication control unit 61 of each charger 13, 24 to 26 in the charging facility 10.

Wireless communication between the communication control unit 51 and the communication control unit 61 is performed, for example, between the vehicle 1 parked in the parking slot 12, 21, 22, 23 and the charger 13, 24, 25, 26 in the parking slot 12, 21, 22, 23 in which the vehicle 1 is parked. In this communication, for example, a control signal for charging the battery 3 or the like is transmitted and received at a close distance. The communication of the control signal or the like can be performed by a protocol based on a standard such as CHAdeMO, for example.

For the wireless communication between the communication control unit 51 and the communication control unit 61, for example, Bluetooth (registered trademark), a specific low-power radio using a frequency in the 920 MHz band, can be used. Alternatively, Zigbee (registered trademark), WiFi (registered trademark), or the like may be used for wireless communication between the communication control units 51 and 61.

The management unit 43 has an operation status/premise monitoring unit 45 and a charging/allocation planning unit 47.

The operation status/premise monitoring unit 45 detects the position of each vehicle 1 in the charging facility 10. The position of each vehicle 1 in the charging facility 10 can be detected, for example, from an image taken by a monitoring camera (not shown) installed in the charging facility 10. In addition, the operation status/premise monitoring unit 45 performs control to guide each vehicle 1 in the charging facility 10 to its destination in accordance with the allocation pattern for each vehicle 1 determined by the charging/allocation planning unit 47.

That is, the operation management device 40, which virtually constructs the management unit 43 having the operation status/premise monitoring unit 45 on hardware, can constitute a movement control unit that moves the vehicle 1 in the charging facility 10 according to the allocation pattern during the charging schedule.

The destination of each vehicle 1 is, for example, any one of the parking slots 12, 21 to 23, 31 to 35 where each vehicle 1 entering the charging facility 10 may park, or otherwise the gate 11 to which each vehicle 1 exiting the charging facility 10 moves.

For example, the charging/allocation planning unit 47 can acquire identification information and specification information on a vehicle 1 and specification information and battery information on a battery 3 from each vehicle 1 by communicating with the vehicle 1 through the communication control units 41 and 51 before the vehicle 1 enters the charging facility 10.

The identification information on the vehicle 1 may include, for example, information such as a number uniquely allocated to the vehicle 1. The number unique to the vehicle 1 is, for example, a chassis number in the case of a Japanese domestic vehicle and a vehicle identification number (VIN) in the case of an imported vehicle. The specification information on the vehicle 1 may include information that can be used to specify the shape of the vehicle 1, such as the length, width, height, weight, and the like of the vehicle 1.

The identification information on the vehicle 1 may include, for example, information on a route on which the vehicle 1 is to travel under autonomous driving control. If the identification information includes information on the route, the information may include at least information on the remaining route, excluding the route that the vehicle 1 traveled before entering the charging facility 10. The information on the route on which the vehicle 1 is to travel may be stored in advance in, for example, an external storage device of the operation management device 40.

The specification information on the battery 3 may include, for example, information for specifying a charging method that can be used for charging the battery 3. The information for specifying the charging method is, for example, information on the battery capacity of the battery 3 in the specification. The battery information on the battery 3 may include, for example, information on the remaining battery level which is the current state of charge (SoC) of the battery 3 shown in FIG. 3A.

The charging/allocation planning unit 47 shown in FIG. 2 communicates with the chargers 13, 24 to 26 of the charging facility 10 through the communication control units 41 and 61, thereby acquiring information on the availability status of each charger 13, 24 to 26.

The charging/allocation planning unit 47 determines whether or not the battery 3 can be charged by the power transmission device with high power based on the specification information on the battery 3. The charging/allocation planning unit 47 determines the target charging level of the battery 3 in the charging facility 10 based on the information on the remaining route on which the vehicle is to travel after leaving the charging facility 10.

The target charging level of the battery 3 is a target charge amount for when the charge amount of the battery 3 is increased by charging in the charging facility 10. In other words, the target charging level is the amount of charge finally accumulated. For example, as shown in FIG. 3B, the target charging level is an amount of electric power obtained by adding a certain margin to the amount of electric power required for driving the vehicle 1 along the remaining route. The charging/allocation planning unit 47 determines the target charging level as a value equal to or less than the full charge capacity of the battery 3.

The charging/allocation planning unit 47 of FIG. 2 calculates the charge amount for the battery 3 in the charging facility 10 based on the target charging level of the battery 3 and the remaining battery level. The charging/allocation planning unit 47 determines the charging pattern for the battery 3 based on the determined charge amount for the battery 3, the determination result of the viability of charging by the power transmission device with high power, and the availability status of the chargers 13, 24 to 26.

The charging/allocation planning unit 47 creates an allocation pattern for moving each vehicle 1, having entered the charging facility 10, in the charging facility 10 in accordance with the charging pattern for each battery 3.

Figure 3A:
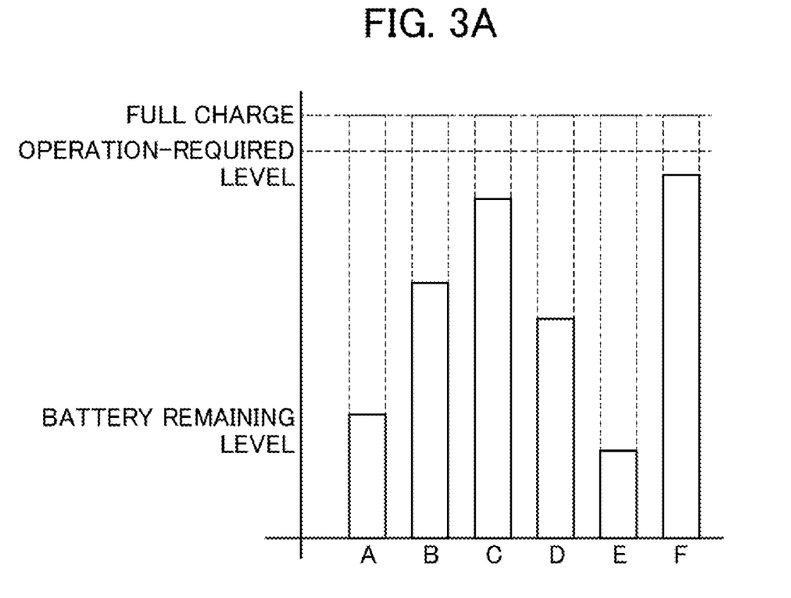
FIG. 3A is a graph showing relationships between the amounts of electric power required for the future operation of vehicles of FIG. 1 and the remaining battery capacities of batteries of the vehicles.
Figure 3B:
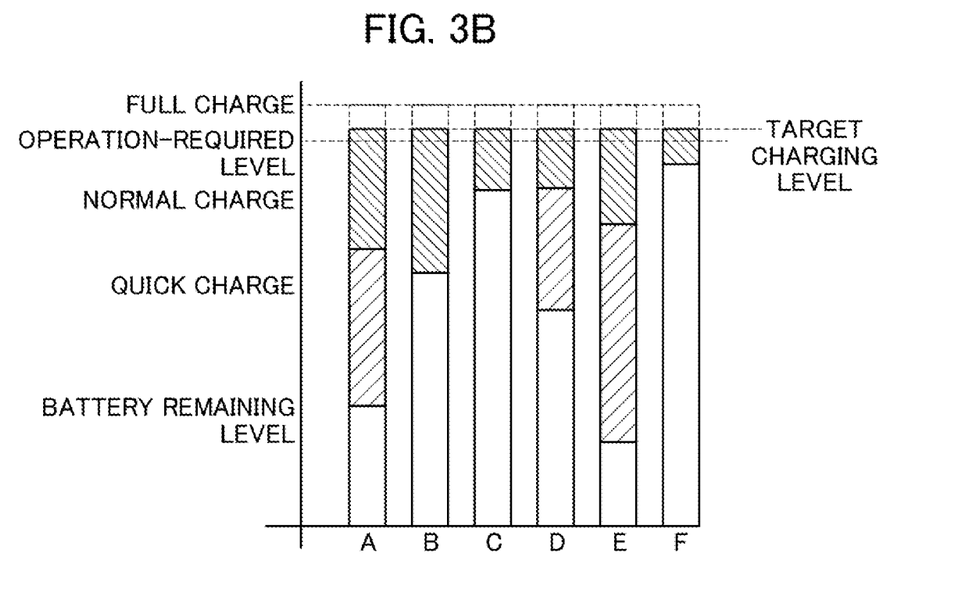
FIG. 3B is a graph showing ratios of the amounts of charging electric power provided by the power transmission devices with high power and low power when an insufficient amount of electric power is charged, to the batteries of FIG. 3A.

In the examples of FIGS. 3A and 3B, there are six vehicles A to F whose batteries 3 are charged in the charging facility 10. FIG. 3B shows a case in which the batteries 3 of the three vehicles 1 denoted by "A", "D", and "E" are charged by combined use of the power transmission devices with high power and lower power, and the batteries 3 of the three vehicles 1 denoted by "B", "C", and "F", are charged only by the power transmission device with low power.

Figure 4:
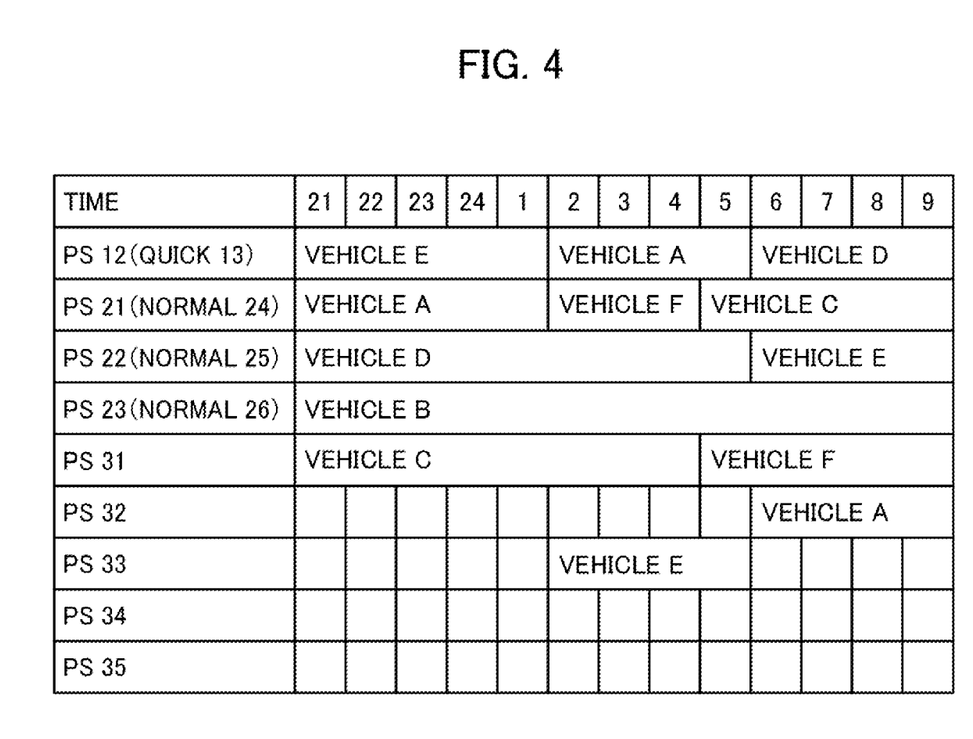
FIG. 4 is an explanatory view showing an allocation pattern for the vehicles to the parking slots in FIG. 1 when the batteries are charged at the ratios shown in FIG. 3B.

When the battery 3 of each vehicle 1 is charged in the pattern shown in FIG. 3B, the charging/allocation planning unit 47 of FIG. 2 creates an allocation pattern for moving vehicles 1 from "A" to "F" to the parking slots 12, 21 to 23, 31 to 35 in the order and timing shown in FIG. 4, for example.

When each vehicle 1 moves in the charging facility 10, it is necessary to avoid interference between the moving vehicles 1. Therefore, the charging/allocation planning unit 47 of FIG. 2 creates an allocation pattern in which the moving vehicles 1 do not interfere with each other in consideration of the shape of each vehicle 1 specified from the specification information on the vehicles 1.

Further, the arrangement of the parking slots 12, 21 to 23, 31 to 35 in the charging facility 10 may be changed to increase the degree of freedom of the travel routes of the vehicles 1 in the allocation pattern created by the charging/allocation planning unit 47.

Figure 5A:
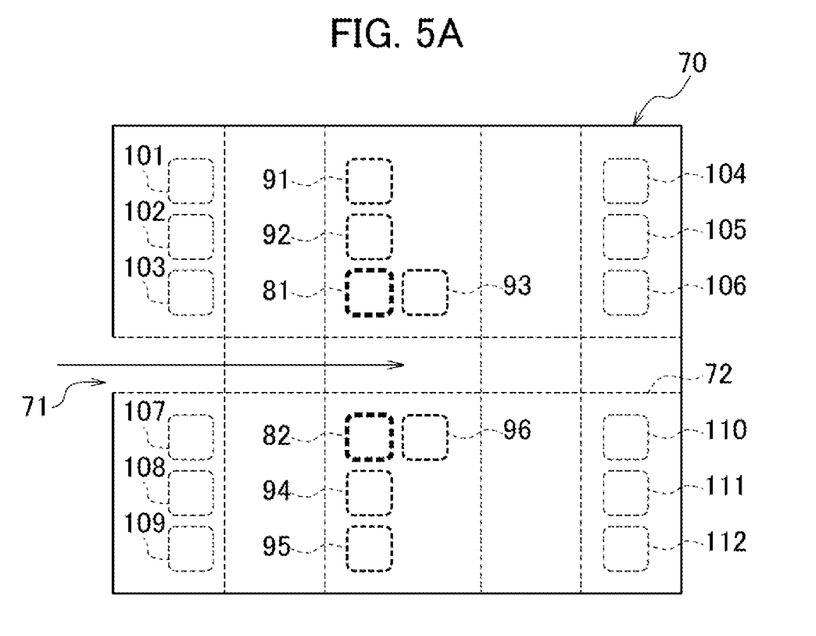
FIGS. 5A and 5B are explanatory views showing a movement pattern for a vehicle between the parking slots in the charging facility of FIG. 1.
Figure 5B:
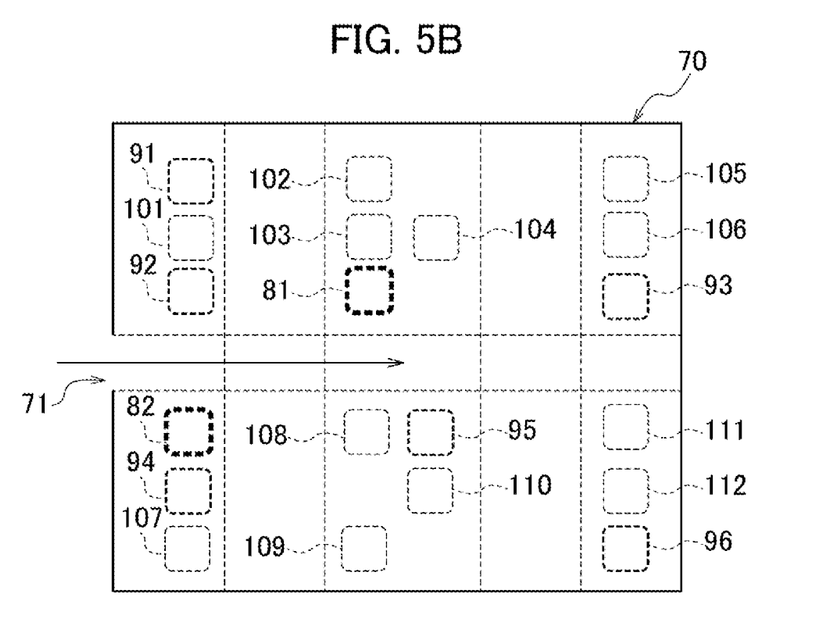

For example, in each of the charging facilities 70 shown in FIGS. 5A and 5B, parking slots 81, 82, 91 to 96, 101 to 112 are located in a dispersed manner on both sides of a central passage 72 leading to a gate (entrance/exit) 71. Chargers (not shown) serving as the power transmission devices with high power are provided on surfaces of the parking slots 81 and 82, and chargers (not shown) serving as power transmission devices with low power are provided on surfaces of the parking slots 91 to 96. A charger is not provided on surfaces of the parking slots 101 to 112. That is, the parking slots 101 to 112 are parking spaces for standby.

In the charging facility 70 shown in FIG. 5A, the parking slots 81, 91 to 93, 101 to 106 and the parking slots 82, 94 to 96, 107 to 112 are arranged symmetrically on both sides of the central passage 72. On the other hand, in the charging facility 70 of FIG. 5B, the parking slots 81, 91 to 93, 101 to 106 and the parking slots 82, 94 to 96, 107 to 112 are randomly arranged on both sides of the central passage 72.

The arrangement of the parking slots 12, 21 to 23, and 31 to 35 in the charging facility 10 shown in FIG. 1 can be determined, for example, as in the charging facility 70 shown in FIGS. 5A and 5B to efficiently move the vehicles 1 in the charging facility 10 without interference between the vehicles 1.

When the charging/allocation planning unit 47 of FIG. 2 prepares a charging schedule for a vehicle 1, it transmits the charging schedule to the target vehicle 1 to enter into the charging facility 10 through the communication control units 41 and 51 based on the identification information on the vehicle 1.

The vehicle 1 includes a vehicle status management unit 53 and an autonomous drive control unit 55. The vehicle status management unit 53 and the autonomous drive control unit 55 can be constituted of an ECU (electronic control unit), for example.

The vehicle status management unit 53 transmits identification information and specification information on the vehicle 1 and specification information and battery information on the battery 3 of the vehicle 1 to the charging/allocation planning unit 47 of the operation management device 40 through the communication control unit 51 before the vehicle 1 enters the charging facility 10. As described above, the battery information on the battery 3 includes information on the remaining battery level of the battery 3.

The vehicle status management unit 53 confirms that the vehicle 1 has stopped at a position within an allowable range where charging is possible, based on, for example, the reception level of a control signal transmitted and received with the charger 13, 24 to 26 of the parking slot 12, 21 to 23 in which the vehicle 1 that has entered the charging facility 10 has parked.

Further, the vehicle status management unit 53 controls the ON and OFF state of a traveling mode performed by means of autonomous drive control of the vehicle 1, and the ON and OFF state of a mode (charging standby mode) enabling charging of the battery 3. That is, the vehicle status management unit 53 manages, on the vehicle 1 side, the charging operations of the chargers 13, 24 to 26 to the battery 3 in accordance with the charging pattern after the stopping position of the vehicle 1 has been confirmed.

The autonomous drive control unit 55 can detect the position, attitude, etc. of the vehicle 1 based on output signals from a GPS (Global Positioning System) sensor and a gyro sensor (not shown) installed in the vehicle 1, for example. The autonomous drive control unit 55 can detect an obstacle or the like existing in the periphery of the vehicle 1 based on, for example, an image taken by a monitoring camera (not shown) installed in the vehicle 1 or an output signal from a sonar (not shown).

The autonomous drive control unit 55 can control the vehicle 1 to travel along a predetermined route while confirming the detected position, attitude, obstacles therearound, etc. of the vehicle 1.

The autonomous drive control unit 55 receives a charging schedule from the charging/allocation planning unit 47 of the operation management device 40 through the communication control unit 51. The autonomous drive control unit 55 can move the vehicle 1 in the charging facility 10 in accordance with an allocation pattern in the received charging schedule.

The chargers 13, 24 to 26 have a charging control unit 63 and an electric-power convertor 65.

The charging control unit 63 includes hardware such as, for example, a CPU, a RAM, a ROM, and a nonvolatile external storage device. The CPU of the charging control unit 63 receives a charging schedule from the charging/allocation planning unit 47 of the operation management device 40 through the communication control unit 61 by executing, for example, a program stored in the ROM or the external storage device.

The charging control unit 63 confirms the vehicle 1 parked in any one of the parking slots 12, 21 to 23 provided with chargers 13, 24 to 26 on the surfaces thereof. The confirmation of the vehicle 1 can be made, for example, by comparing a vehicle 1 specified by, for example, control signals transmitted and received with the vehicle 1, with a vehicle 1 specified by a charging pattern in a received charging schedule.

Similar to the vehicle status management unit 53 of the vehicle 1, the charging control unit 63 confirms that the vehicle 1 has stopped at a position within an allowable range where the charging is possible, based on, for example, a reception level of a control signal transmitted and received with the vehicle status management unit 53.

Further, the charging control unit 63 controls the ON and OFF state of the standby mode which enables charging of the battery 3 by the charger 13, 24 to 26. That is, the charging control unit 63 manages the charging operation of the charger 13, 24 to 26 to the battery 3 in accordance with the charging pattern after the stopping position of the vehicle 1 has been confirmed.

The electric-power convertor 65 sets electric power for charging the battery 3 to a value based on the charging pattern of the charging schedule received by the charging control unit 63. Here, the electric power will be wirelessly transmitted from a coil (not shown) of the charger 13, 24 to 26 to the vehicle 1.

Next, an example of processes executed by the charging/allocation planning unit 47 of the management unit 43 in the charging facility 10 will be described with reference to FIG. 6.

The charging/allocation planning unit 47 first confirms whether or not a vehicle 1 has approached the charging facility 10 (step S11). The approach of a vehicle 1 to the charging facility 10 can be confirmed, for example, by the reception of a radio signal by a wireless access point (not shown) installed in the charging facility 10. Here, the radio signal indicates identification information and specification information on the vehicle 1, and specification information on and battery information on the battery 3.

When a vehicle 1 has not approached the charging facility (No in step S11), step S11 is repeated until a vehicle 1 approaches the charging facility 10. When a vehicle 1 approaches the charging facility 10 (Yes in step S11), the charging/allocation planning unit 47 acquires the received identification information and specification information on the vehicle 1 and the specification information and battery information on the battery 3 (step S13). The information acquired by the charging/allocation planning unit 47 may include billing information to the owner or the like of the vehicle 1 regarding the charging of the battery 3.

The charging/allocation planning unit 47 calculates a target charging level of the battery 3 of the vehicle 1 using the received information, and calculates a charge amount for the battery 3 required to increase the state of charge to the target charging level based on the remaining battery level of the battery 3 (step S15).

The charging/allocation planning unit 47 selects at least one charger from among the chargers 13, 24 to 26 to be used for charging the battery 3 and calculates a charging time for which charging is to be performed by the charger. Further, the charging/allocation planning unit 47 calculates the order in which charging is to be performed when two or more chargers 13, 24 to 26 will be used (step S17).

The charging/allocation planning unit 47 determines amounts of transmission power of the chargers 13, 24 to 26 that can charge the battery 3 of the vehicle 1 to the target charging level during a predetermined time (step S19). Here, the predetermined time may be, for example, a time period (time zone) during which the vehicle 1 is parked in any one of the parking slots 12, 21 to 23, 31 to 35 in the charging facility 10 and does not leave the charging facility 10.

FIG. 4 shows a case which sets, for the predetermined time, 12 hours from 21:00 (9:00 PM) to 9:00 AM of the next day when the charging facility 10 is used as a parking lot. Regardless of whether the charging facility 10 is used as a parking lot or not, the predetermined time may be set in any time zone such as during the daytime, the nighttime, or both. The predetermined time can be set to any length.

The charging/allocation planning unit 47 determines the amounts of power transmission of the chargers 13, 24 to 26 within the allowable range of the battery 3 based on the specification information on the battery 3 received from the vehicle 1.

Next, the charging/allocation planning unit 47 confirms the order of use of the chargers 13, 24 to 26 used for charging the battery 3 according to the calculations or decisions of steps S15 to S19 (step S21). Further, the charging/allocation planning unit 47 confirms the order in which the vehicle 1 is received by the parking slots 12, 21 to 23, 31 to 35 in the charging facility 10 according to the calculations, decisions, or confirmations of steps S15 to S21 (step S23).

Then, the charging/allocation planning unit 47 creates a charging schedule for the battery 3 based on the calculations, decisions, or confirmations of step S15 to S23 (step S25), and sends the created charging schedule to the vehicle 1 and the respective chargers 13, 24 to 26 (step S27). The series of processes is thereby completed.

Figure 7:
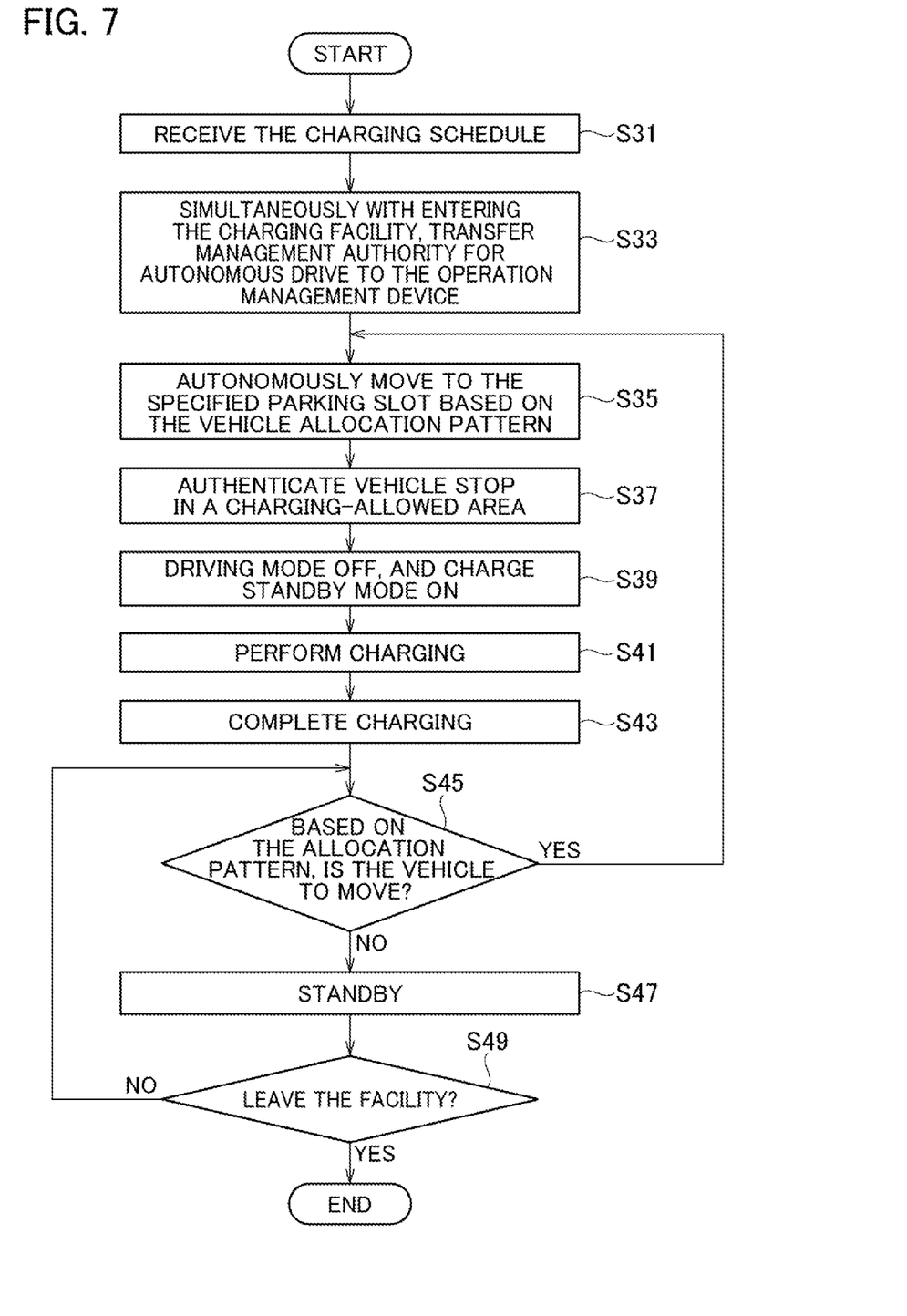
FIG. 7 is a flowchart showing an example of processes executed by a vehicle status management unit of the vehicle of FIG. 2.

Next, an example of processes executed by the vehicle status management unit 53 of the vehicle 1 will be described with reference to FIG. 7.

When receiving the charging schedule from the charging/allocation planning unit 47 of the operation management device 40 (step S31), the vehicle status management unit 53 transfers the management authority of the autonomous driving control of the vehicle 1 to the charging/allocation planning unit 47 according to the charging schedule (step S33).

Subsequently, the vehicle status management unit 53 moves the vehicle 1 to the parking slots 12, 21 to 23, 31 to 35 as the destination by means of autonomous driving control based on the allocation pattern in the received charging schedule (step S35).

Then, using control signals or the like that the vehicle 1 sends and receives to and from the chargers 13 and 24 to 26, the vehicle status management unit 53 confirms that the vehicle 1 has stopped at a position, where the battery 3 can be charged, in the parking slots 12, 21 to 23 designated by the allocation pattern (step S37). The vehicle status management unit 53 performs this confirmation when the destination where the vehicle 1 stops is any one of the parking slots 12, 21 to 23 having the chargers 13, 24 to 26.

Next, the vehicle status management unit 53 turns off the driving mode of the vehicle 1, turns on the charging standby mode of the battery 3 (step S39), charges the battery 3 (step S41), and completes the charging of the battery 3 according to the charging pattern (step S43). Then, the vehicle status management unit 53 confirms whether or not it is set in the allocation pattern that the vehicle 1 is to be moved to a next parking slot 12, 21 to 23, 31 to 35 (step S45).

When movement of the vehicle 1 has been set (Yes in step S45), the process returns to step S35. When movement of the vehicle 1 has not been set (No in step S45), the vehicle status management unit 53 keeps the vehicle 1 waiting for a predetermined time (step S47), and thereafter moves the vehicle 1 out of the charging facility 10 through the gate 11 (step S49). The series of processes is thereby completed.

Figure 8:
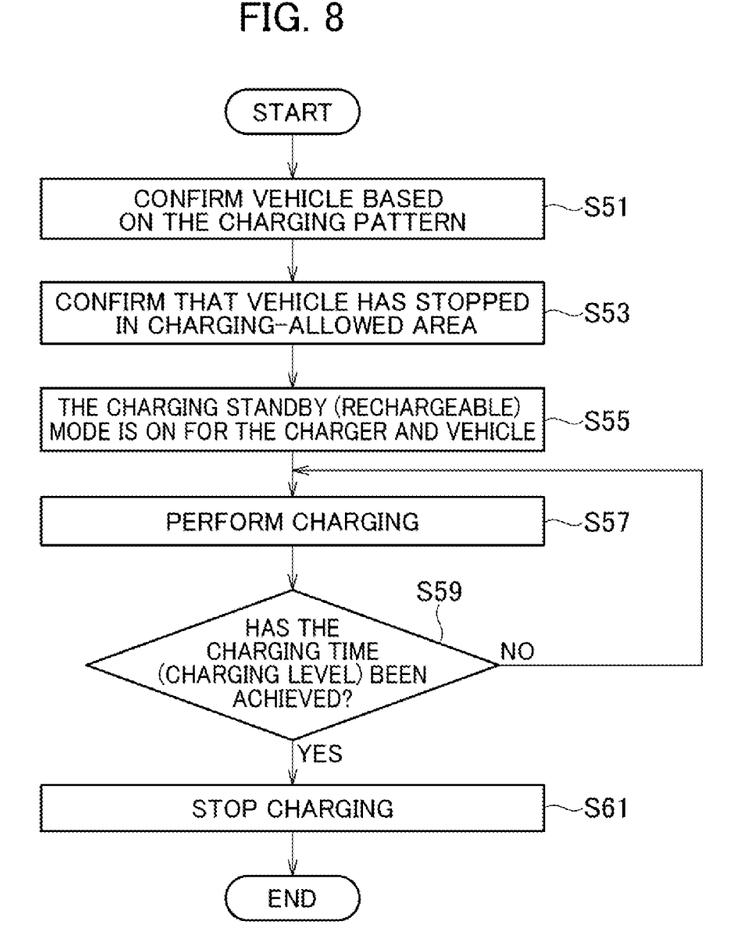
FIG. 8 is a flowchart showing an example of processes executed by a charging control unit of a charger shown in FIG. 2.

Next, an example of processes executed by the charging control unit 63 of a charger 13, 24 to 26 will be described with reference to FIG. 8.

Using control signals or the like that the charger 13 and 24 to 26 sends and receives to and from the vehicle 1, the charging control unit 63 confirms that the vehicle 1 designated by the allocation pattern has stopped at a position, where the battery 3 can be charged, in a parking slot 13, 24 to 26 (step S51). The charging control unit 63 performs this confirmation when receiving the charging schedule from the charging/allocation planning unit 47 of the operation management device 40.

Next, using control signals or the like that the charger 13 and 24 to 26 sends and receives to and from the vehicle 1, the charging control unit 63 confirms that the vehicle 1 designated by the allocation pattern has stopped at a position, where the battery 3 can be charged, in a parking slot 12 and 21 to 23 (step S53). The charging control unit 63 performs this confirmation when the vehicle 1 stops at the parking slot 12, 21 to 23 on which the corresponding charger 13, 24 to 26 is provided.

Subsequently, using control signals or the like that the charger 13, 24 to 26 sends and receives to and from the vehicle 1, the charging control unit 63 confirms whether or not the charging standby mode is ON for the battery 3 of the vehicle 1 in the parking slot 12, 21 to 23. The charging control unit 63 also confirms whether or not the charging standby mode is ON for the charger 13, 24 to 26 (step S55). Thereafter, the charging control unit 63 wirelessly supplies electric power at the transmission power set by the electric-power convertor 65, from the charger 13, 24 to 26 to the battery 3 of the vehicle 1 stopped at the parking slot 12, 21 to 23.

Next, the charging control unit 63 confirms whether or not the battery 3 has been charged within the charge time or by the charge amount set in the charging pattern (step S59). When the battery 3 is not charged (No in step S59), the process returns to step S57. When the battery 3 has been charged (Yes in step S59), the charging control unit 63 stops charging (step S61), and then ends the series of processes.

Figure 6:
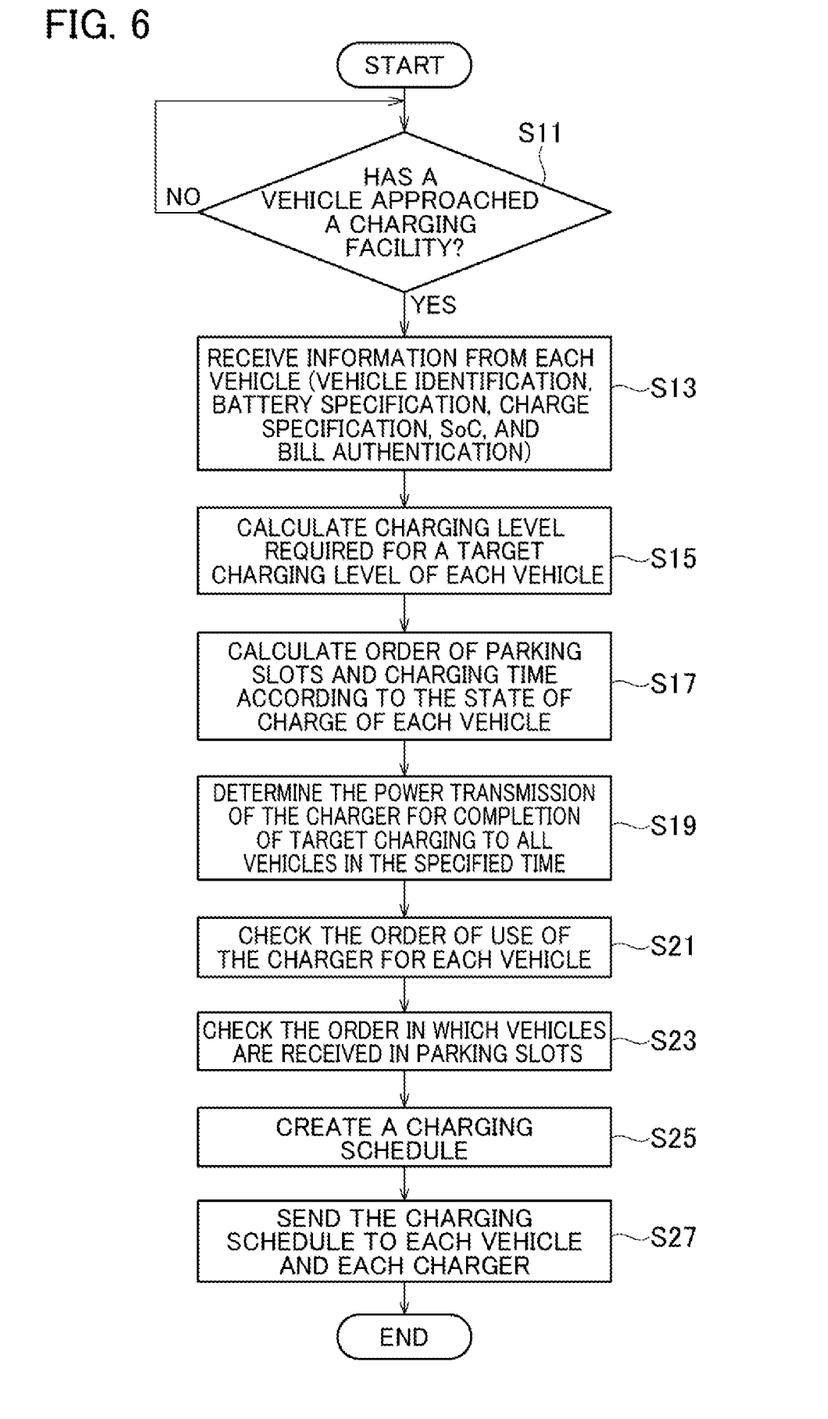
FIG. 6 is a flowchart showing an example of processes executed by a charging/allocation planning unit of the management unit of FIG. 2.

In the embodiment described above, due to the charging/allocation planning unit 47 executing the procedure of step S13 in FIG. 6, the operation management device 40 can constitute an information acquisition unit which acquires information necessary for charging the battery 3 of the vehicle 1. Further, in the present embodiment, due to the charging/allocation planning unit 47 executing the procedure of steps S15 to S23 in FIG. 6, the operation management device 40 can constitute an optimization unit that performs optimization so that the power consumption in the charging facility 10 is suppressed to the maximum allowable power amount or less.

In the embodiment described above, the operation management device 40 creates a charging schedule for the battery 3 based on, for example, a charging method that can be used to charge the battery 3 of a vehicle 1 entering the charging facility 10, a battery capacity in a specification, a remaining battery level, a target charging level, and the like.

The charging pattern in the charging schedule can be created in such a manner that the battery 3 of each vehicle 1 in the charging facility 10 can be efficiently charged by suppressing the maximum value and the total value of the amount of electric power consumed in the entire charging facility 10 within the respective allowable ranges. The allocation pattern in the charging schedule can be created in such a manner that moving vehicles 1 do not interfere with each other when the vehicles 1 move in the charging facility 10 according to the charging pattern.

Accordingly, in the charging facility 10 having multiple parking slots 12, 21 to 23 provided with chargers 13, 24 to 26 for charging the battery 3 of a vehicle 1, the battery 3 can be efficiently charged by selectively using the high-power charger 13 and the low-power chargers 24 to 26.

In the embodiment described above, the operation status/premise monitoring unit 45 of the operation management device 40 may create an allocation pattern that minimizes the moving distance of a vehicle 1 in the charging facility 10 according to the charging pattern. The charging pattern created by the charging/allocation planning unit 47 of the operation management device 40 need not be such that all batteries 3 are charged by 9:00 AM of the next day as shown in FIG. 4.

In the embodiment described above, each of the power transmission devices with high power and the power transmission devices with low power is one type. However, at least one of the power transmission devices with high power and the power transmission devices with low power may be two or more types. Specifically, for example, a power transmission device having a rated output capacity of 10 kW may be used as a power transmission device with high power, and a power transmission device having a rated output capacity of 2 kW and a power transmission device having a rated output capacity of 3 kW may be used as power transmission devices with low power.

The power transmission device which is used as a power transmission device with low power for charging an on-vehicle battery in the first charging schedule may be used as a power transmission device with high power in the second charging schedule in combination with a power transmission device different from the power transmission device used in the first charging schedule. Specifically, for example, a power transmission device having a rated output capacity of 5 kW, which is considered to be a power transmission device with low power in combination with a power transmission device having a rated output capacity of 10 kW, may be used as a power transmission device with high power in combination with a power transmission device having a rated output capacity of 2 kW in another charging schedule.

In the embodiment described above, the vehicle 1 is a vehicle under autonomous driving control, but the vehicle 1 does not have to be such a vehicle as long as the vehicle is electrically controlled. In such a case, the configuration for moving the vehicle 1 in the charging facility 10 to the destination by means of the autonomous driving control according to the allocation pattern may be omitted, and a device for providing the allocation pattern to the driver of the vehicle 1 may be provided instead.

The device for showing the allocation pattern may be provided in the vehicle 1 or may be installed at a place visible for an operator of the charging facility 10. This device provided in the vehicle 1 can also be configured as a configuration of a car navigation device, for example.

Although several embodiments have been described above, the embodiments may be modified or modified based on the above disclosure. All of the components of the above embodiments and all of the features described in the claims may be individually extracted and combined as long as they do not contradict each other.

What is claimed is:

1. An operation management device for a charging facility in which charging spaces coexist, power transmission devices having different rated output capacities being installed in the charging spaces, comprising:
    an information acquisition unit configured to acquire information, which is necessary for charging an on-vehicle battery of a vehicle entering the charging facility and includes identification information and specification information on the vehicle and specification information and battery information on the on-vehicle battery, from the vehicle; and
    an optimization unit configured to create a charging schedule for increasing a charge amount of the on-vehicle battery to a target charging level by charging with an available one of the power transmission devices in the charging spaces and optimize the charging schedule based on the acquired information so that power consumption in the charging facility is suppressed to a maximum allowable power amount or less.

2. The operation management device according to claim 1, wherein
    the optimization unit optimizes the charging schedule to minimize a moving distance of the vehicle in the charging facility.

3. The operation management device according to claim 1, wherein
    the optimization unit optimizes the charging schedule so that charging of the on-vehicle battery of the vehicle in the charging facility to the target charging level is completed within a predetermined time.

4. The operation management device according to claim 1, wherein
    the information includes identification information on the vehicle, a corresponding charging method of the on-vehicle battery, and a current state of charge.

5. The operation management device according to claim 1, wherein
    the charging facility also serves as a parking lot, and the charging spaces also serve as parking slots of the parking lot.

6. The operation management device according to claim 1, wherein
    the vehicle is an autonomous driving control vehicle, and
    the operation management device further comprises a movement control unit configured to move the autonomous driving control vehicle in the charging facility according to the charging schedule optimized by the optimizing unit.

7. The operation management device according to claim 1, wherein
    the optimization unit includes in the charging schedule a movement of the vehicle between the charging spaces in which the power transmission devices having different rated output capacities are installed.

8. The operation management device according to claim 1, wherein
    the charging facility includes a parking slot having no power transmission device, and
    the optimization unit includes in the charging schedule a movement of the vehicle between any one of the charging spaces and the parking slot having no power transmission device.

9. The operation management device according to claim 1, wherein the vehicle is an electric vehicle or a plug-in hybrid vehicle.

* * * * *